United States Patent Office 3,443,637
Patented May 13, 1969

3,443,637
METHOD FOR PLACING GRAVEL PACKS
Derry D. Sparlin, Ponca City, Okla., and William C. Bond, Casper, Wyo., assignors to Continental Oil Company, Ponca City, Okla., a corporation of Delaware
No Drawing. Filed June 21, 1967, Ser. No. 647,597
Int. Cl. E21b 33/13, 43/22
U.S. Cl. 166—295                                    17 Claims

ABSTRACT OF THE DISCLOSURE

Discloses a method of gravel packing wells using a slurry of gravel in a carrier fluid and including a tackifier or tackifying agent insoluble in the carrier fluid. Tackifiers include thermosetting resins, thermoplastic polymers, rubbers, gums, natural resins, waxes, greases, heavy oils and simple syrup.

BACKGROUND OF THE INVENTION

This invention relates to methods of completing oil, gas or water wells wherein particulated material, such as gravel, is positioned in a well bore between a producing formation and a screen member to minimize the migration of sand and other granular material from the formation into the well. Moore particularly, the invention relates to an improved method for transporting the gravel material and maintaining it at a desired location in the well bore.

SUMMARY OF PRIOR ART

The technique of "gravel-packing" to restrict the passage of sand or other particulate matter from the producing formation into the well is well known, particularly in the art of oil and gas production. Gravel packing basically consists of mixing a selected size-grading of gravel, sand, cement clinker or other material in a fluid carrier, such as fresh water, brine, oil, or gas, and pumping the resulting slurry down the annulus between the well bore wall and a centrally located well screen. The fluid carrier filters through the screen and is returned to the surface leaving a porous permeable "pack" of granular material between the wall of the well bore and the well screen. This porous pack substantially reduces the migration of particles from the producing formation into the well and the attendant problems of equipment erosion and well bore plugging.

More recently a technique of pressure packing has evolved in which back pressure in the well is maintained sufficiently high so that when the gravel slurry is pumped into the well most of the carrier fluid filters into the formation and the gravel pack created is forced back into the producing formations. Pressure packing creates a more intimate contact between the producing formation face and the gravel pack, replaces low permeability formation sand with high permeability gravel around the well bore, and in effect increases the effective diameter of the well bore.

The success of gravel packing, particularly when smaller sized gravels are used, is sometimes impaired when formation sand from the producing zone mixes with the gravel during placement of the gravel pack. This mixing results in a reduction of permeability of the completed gravel pack due to the inclusion of the finer sand particles within the interstices or pore spaces of the gravel pack. Correspondingly, the flow capacity and productivity of the well are reduced.

OBJECTS OF THE INVENTION

An object of this invention is to increase the productivity of wells in which a gravel pack is placed.

Another object of this invention is to improve the effectiveness of the gravel pack placed in a well.

Another object of this invention is to prevent the mixing of formation sand and other particles with the gravel pack material, when the latter is pumped in a slurry form into a well bore.

SUMMARY

Briefly stated, our invention comprises including in the fluid slurry of particulate matter, such as gravel, pumped into a well bore to form a gravel pack, a tackifier or tackifying agent. The term "gravel" includes any particulate mineral, such as gravel, sand, cement clinker, or other material usable in a gravel packing operation.

"Tack" or tackiness" is defined as the property of matter that enables surfaces to merge on contact or with pressure and to resist separation thereafter. A "tackifier" or "tackifying agent" is a material that has a tendency to impart tackiness to compositions in which it is present. The tackifier in this application provides the gravel particles with an affinity for one another thereby promoting plug or piston-like flow of the mass of gravel particles through the well bore annulus and minimizing the mixing of gravel with formation sand. It should be pointed out that the purpose of the tackifier is not to consolidate the gravel into a rigid unyielding mass but rather into a coherent but deformable mass.

PREFERRED EMBODIMENTS OF THE INVENTION

The classes of materials which readily are used in our invention as tackifiers or tackifying agents include thermosetting resins, thermoplastic polymers, rubbers, gums, natural resins, waxes, greases, heavy oils and simple syrups (this latter comprising a viscous solution of sugar in water).

Specific examples of thermosetting resins which are used in our invention are phenolic resins (hydroxy arylaldehyde condensation products, hydroxy alkylaryl aldehyde condensation products) amine aldehydes, furane resins, epoxy resins, polyisocyanate resins, and polyester resins. Of these, phenol formaldehyde and furane resins are preferred.

Specific examples of thermoplastic polymers which are used in our invention are cellulose resins, polyethylene, silicone and polyvinyl polymers. Of these, cellulose resins are preferred.

Specific examples of rubbers which are used in our invention are styrene-butadiene, neoprene poly 2-chlorobutadiene, acrylonitrile butadiene, nitrile, ethylene-propylene, natural and reclaimed rubbers. Of these, styrene-butadiene and reclaimed rubber are preferred.

Specific examples of gums which are used in our invention are copals, rosins, and modified rosins. Of these, modified rosins are preferred.

Specific examples of natural resins which are used in our invention are crude oils, heavy refined oils, tars, asphalts and residual oils. Of these, residual hydrocarbon oils and heavy hydrocarbon refined oils are preferred.

The type of tackifier selected for a particular use will depend upon the carrier liquid used for the gravel. In general, the tackifier should not be soluble in the carrier liquid but should have sufficient affinity for the gravel material that it will readily coat the particulate surfaces. Thus, if water, brine, or water base muds are used as the carrier fluid, greases, waxes and water-insoluble thermosetting resins, thermoplastic polymers, rubbers, gums and natural resins should be used. Similarly if the carrier fluid is a hydrocarbon oil or oil base mud, the tackifier should be an oil-insoluble thermosetting resin, thermoplastic polymer, rubber, gum, natural resin, or simple syrup. It is required that the carrier fluid have sufficient viscosity to maintain the gravel in suspension. For this purpose the carrier fluid should be gelled with an appropriate gelling agent. For example oil base fluids can be gelled with soaps such as napalm and water base fluids can be gelled with guar gum.

In general, the gravel slurry should contain between about 2 and about 30 pounds of gravel per gallon of carrier fluid and between about .01 and about 10 gallons of tackifying agent per cubic foot of gravel and should have a viscosity between 1 and 1000 centipoises. Preferably, the slurry should contain 10 to 20 pounds of gravel per gallon of carrier fluid and 0.25 to 0.5 gallon of tackifying agent per cubic foot of gravel and the carrier fluid should have a viscosity between 100 and 700 centipoises. A preferred mesh size for the gravel is between 40 and 60 mesh (U.S. Standard Sieve sizes). The volume units of gravel are bulk volume.

The technique for placing the gravel pack of our invention is that now conventionally used. A tubing string having a screen member extending downwardly therefrom is positioned in the well at the desired depth with the screen member opposite the producing formation. The producing formation may be completely exposed, as in an "open hole" completion, or may be partially supported by perforated or slotted casing. A slurry of gravel, viscous carrier fluid, and tackifier is pumped down the annulus between tubing and casing to the location of the screen member where the carrier fluid is filtered through the screen and flowed up the interior of the centrally located tubing string. The gravel material is filtered out and remains in place between the screen and producing formation. If it is desirable to carry out pressure packing, the carrier fluid is not returned through the tubing string but is forced out into the producing formation with continued injection of the slurry mixture. When sufficient gravel slurry has been injected into the well bore annulus, pumping is stopped and the well as returned to fluid production.

The method of mixing the gravel, tackifier and carrier is accomplished in any of several known ways. The carrier fluid for example can be piped to the well head and the gravel and tackifier metered into the flow line from storage hoppers attached by conduits to the flow line.

EXAMPLE

A well in southern Louisiana with perforations from 2003 to 2011 feet was gravel packed with three sacks of 0.04 to 0.06 inch gravel by conventional gravel packing techniques. Water, the carrier fluid, containing 2 to 4 pounds of gravel per gallon was pumped at a rate of 8 barrels per minute into the well. A total of 1000 pounds of gravel was packed in the well. The production rate after the gravel pack was in place was 75 barrels of fluid per day, but fine sand was also produced, and the production rate slowly decreased with time.

The same well was then cleaned out and again packed with gravel. The gravel size was 0.0165 to 0.0331 inch (approximately 5 mesh–20 mesh). The packing was similar to that just described except that least crude was used instead of water. The production rate after the gravel pack was in place was 5 barrels of fluid per day with little, if any, sand production.

The same well was cleaned out and again gravel packed using 0.0098 to 0.0165 inch gravel (40–60 U.S. mesh). The carrier fluid was a heavy refined oil with a viscosity of 125 cp. A tackifying agent, a phenolic furan resin (33 percent phenol formaldehyde resin in 67 percent furfuryl alcohol, Resin No. 7421A manufactured by Durez Plastics Division, Hooker Chemical Company) was added in a ratio of 1½ gallons per 100 pounds of sand. The sand-oil ratio was 15 pounds per gallon. The pumping rate was 2 barrels per minute at the beginning and reduced to ½ barrel per minute toward the end of the treatment. A total of 4000 pounds of gravel was injected. The production rate after treatment was 65 barrels per day and remained steadily so, with no indication of sand production. This last treatment indicates the superior results achieved using a tackifying agent over conventional treatments or those using finer gravel packing material.

As many possible embodiments may be made of the invention without departing from the scope thereof, it is to be understood that all matter herein set forth is to be interpreted as illustrative and not in a limiting sense. The invention, having been described, what is claimed is:

1. In the method of treating a well bore wherein a slurry of particulate matter in a fluid carrier having a viscosity between about 1 and about 1,000 centipoise is injected into the well bore opposite a production zone to create a permeable deformable plastic deposit of said particulate matter against the wall of said well bore, thereby minimizing migration of sand and other granular materials into the well bore from said production zone, the improvement comprising: including in said slurry a tackifier insolvent in said fluid carrier prior to injecting said slurry into said well bore, both the fluid carrier and tackifier separating from said particulate matter when said deposit of particulate matter forms.

2. The method of claim 1 wherein said tackifier is selected from the group consisting of thermosetting resins, thermoplastic polymers, rubbers, gums, natural resins, waxes, greases, heavy oils, and simple syrup.

3. The method of claim 1 wherein said fluid carrier is selected from the group consisting of fresh water, brine, and hydrocarbon oils and has a viscosity between about 100 and about 700 centipoises.

4. The method of claim 1 wherein said tackifier is included in said slurry in an amount of between about .01 and about 10 gallons per cubic foot of particulate matter.

5. The method of claim 1 wherein said granular material is included in said slurry in an amount of between about 2 and about 30 pounds per gallon of fluid carrier.

6. The method of claim 1 wherein said tackifier is included in said slurry in an amount of between about 0.25 and 0.5 gallon per cubic foot of particulate material.

7. The method of claim 1 wherein said granular material is included in said slurry in an amount of between about 10 and about 20 pounds per gallon of carrier fluid and said granular material is between 40 and 60 mesh (U.S. Standard Sieve size).

8. The method of claim 4 wherein said granular material is included in said slurry in an amount of between about 10 and about 20 pounds per gallon of fluid carrier.

9. The method of claim 8 wherein said fluid carrier is water and said tackifier is insoluble in water.

10. The method of claim 8 wherein said fluid carrier is a hydrocarbon liquid and said tackifier is insoluble in said hydrocarbon liquid.

11. The method of claim 1 wherein said tackifier is a thermosetting resin.

12. The method of claim 1 wherein said tackifier is a thermoplastic polymer.

13. The method of claim 1 wherein said tackifier is rubber.

14. The method of claim 1 wherein said tackifier is wax.

15. The method of claim 1 wherein said tackifier is simple syrup.

16. The method of claim 1 wherein said tackifier is selected from the group consisting of phenol formaldehyde resin, furane resin, cellulose resin, styrene-butadiene rubber, reclaimed rubber, modified rosins, residual hydrocarbon oils and heavy hydrocarbon oils.

17. In the method of treating a well bore wherein a slurry of between about 10 and about 20 pounds of particulate matter per gallon of hydrocarbon oil, having a viscosity of between 100 and 700 centipoise, is injected into a well bore opposite a production zone to create a permeable deposit of said particulate matter against the wall of said well bore thereby minimizing the migration of sand and other granular material into the well bore from said production zone, the improvement comprising: including in said slurry, prior to injecting said slurry into said well bore, between about 0.25 and 0.5 gallon of uncatalyzed phenolic furan resin, both the hydrocarbon oil and uncatalyzed phenolic furan resin separating from said particulate matter when the permeable deposit of said particulate matter is formed.

References Cited

UNITED STATES PATENTS

| | | | |
|---|---|---|---|
| 2,285,291 | 6/1942 | Larsen | 166—20 |
| 2,325,218 | 7/1943 | Beissinger | 166—16 |
| 2,815,815 | 12/1957 | Hower | 166—33 X |
| 2,823,753 | 2/1958 | Henderson | 166—33 X |
| 2,900,027 | 8/1959 | Cooper | 166—33 |
| 2,985,538 | 5/1961 | Nesbitt | 166—33 X |
| 3,123,137 | 3/1964 | Young | 166—33 |
| 3,137,346 | 6/1964 | McLennan | 166—20 |
| 3,285,339 | 11/1966 | Walther | 166—33 |

NILE C. BYERS, JR., *Primary Examiner.*